United States Patent
Markwart et al.

(10) Patent No.: US 8,929,206 B2
(45) Date of Patent: Jan. 6, 2015

(54) METHOD OF SUPERVISING A NODE IN A COMMUNICATION SYSTEM

(75) Inventors: Christian Markwart, Munich (DE); Hans Jochen Morper, Erdweg (DE)

(73) Assignee: Nokia Solutions and Networks Oy, Espoo (FI)

( * ) Notice: Subject to any disclaimer, the term of this patent is extended or adjusted under 35 U.S.C. 154(b) by 85 days.

(21) Appl. No.: 13/576,410

(22) PCT Filed: Feb. 4, 2010

(86) PCT No.: PCT/EP2010/051388
§ 371 (c)(1),
(2), (4) Date: Aug. 1, 2012

(87) PCT Pub. No.: WO2011/095215
PCT Pub. Date: Aug. 11, 2011

(65) Prior Publication Data
US 2012/0307630 A1    Dec. 6, 2012

(51) Int. Cl.
| H04L 12/26 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl.
USPC ........... 370/228; 370/216; 370/223; 370/242; 709/224

(58) Field of Classification Search
USPC ........... 370/228–389, 390–401; 709/223–229
See application file for complete search history.

(56) References Cited

U.S. PATENT DOCUMENTS

| 6,421,725 | B1 * | 7/2002 | Vermilyea et al. ............ 709/224 |
| 6,990,352 | B2 * | 1/2006 | Pyhalammi et al. .......... 455/466 |
| 8,045,477 | B2 * | 10/2011 | Gazzola et al. ............... 370/242 |
| 8,065,402 | B2 * | 11/2011 | Chen et al. .................... 709/223 |
| 8,320,238 | B2 * | 11/2012 | Takase et al. ................. 370/228 |
| 2001/0044840 | A1 * | 11/2001 | Carleton ....................... 709/223 |
| 2005/0160165 | A1 | 7/2005 | Chen et al. |
| 2006/0031480 | A1 * | 2/2006 | Nijemcevic et al. .......... 709/224 |
| 2008/0148379 | A1 | 6/2008 | Xu et al. |
| 2008/0317006 | A1 * | 12/2008 | Li et al. ......................... 370/352 |
| 2009/0168656 | A1 * | 7/2009 | Ito .............................. 370/241.1 |
| 2009/0262682 | A1 | 10/2009 | Khetawat et al. |
| 2011/0270771 | A1 * | 11/2011 | Coursimault et al. ........ 705/304 |

OTHER PUBLICATIONS

International Search Report and Written Opinion dated May 3, 2010 corresponding to International Patent Application No. PCT/EP2010/051388.

(Continued)

Primary Examiner — Man Phan
(74) Attorney, Agent, or Firm — Squire Patton Boggs (US) LLP

(57) ABSTRACT

A method of supervising a node in a communication system, the communication system comprising a OAM system, a Femto node controlled by the OAM system, and a first communication path between the node and the OAM system, the method comprising the steps of: determining that the node is unable to receive commands sent by the OAM system via the first communication path; establishing a second communication path between the node and the supervising entity via a cellular network; and sending a trigger message to the node via the second communication path to initiate a communication path set up on the first communication path towards the OAM system.

16 Claims, 7 Drawing Sheets

(56) References Cited

OTHER PUBLICATIONS

3GPP TR 33.820 V8.2.0, (Sep. 2009), 3rd Generation Partnership Project; Technical Specification Group Service and System Aspects; Security of H(e)NB; (Release 8); Sep. 1, 2009, pp. 1-82, XP050376887.

Jürgen Schmidt: "The hole trick; How Skype & Co. get round firewalls"; The H Security; Dec. 15, 2012; http://www.h-online.com/security/How-Skype-Co-get-round-firewalls--/features/82481; 4 pages.

Broadband forum "TR-069, CPE WAN Management Protocol v1.1"; Version: Issue 1 Amendment 2, Version Date: Dec. 2007, XP-002493850, 138 pages.

\* cited by examiner

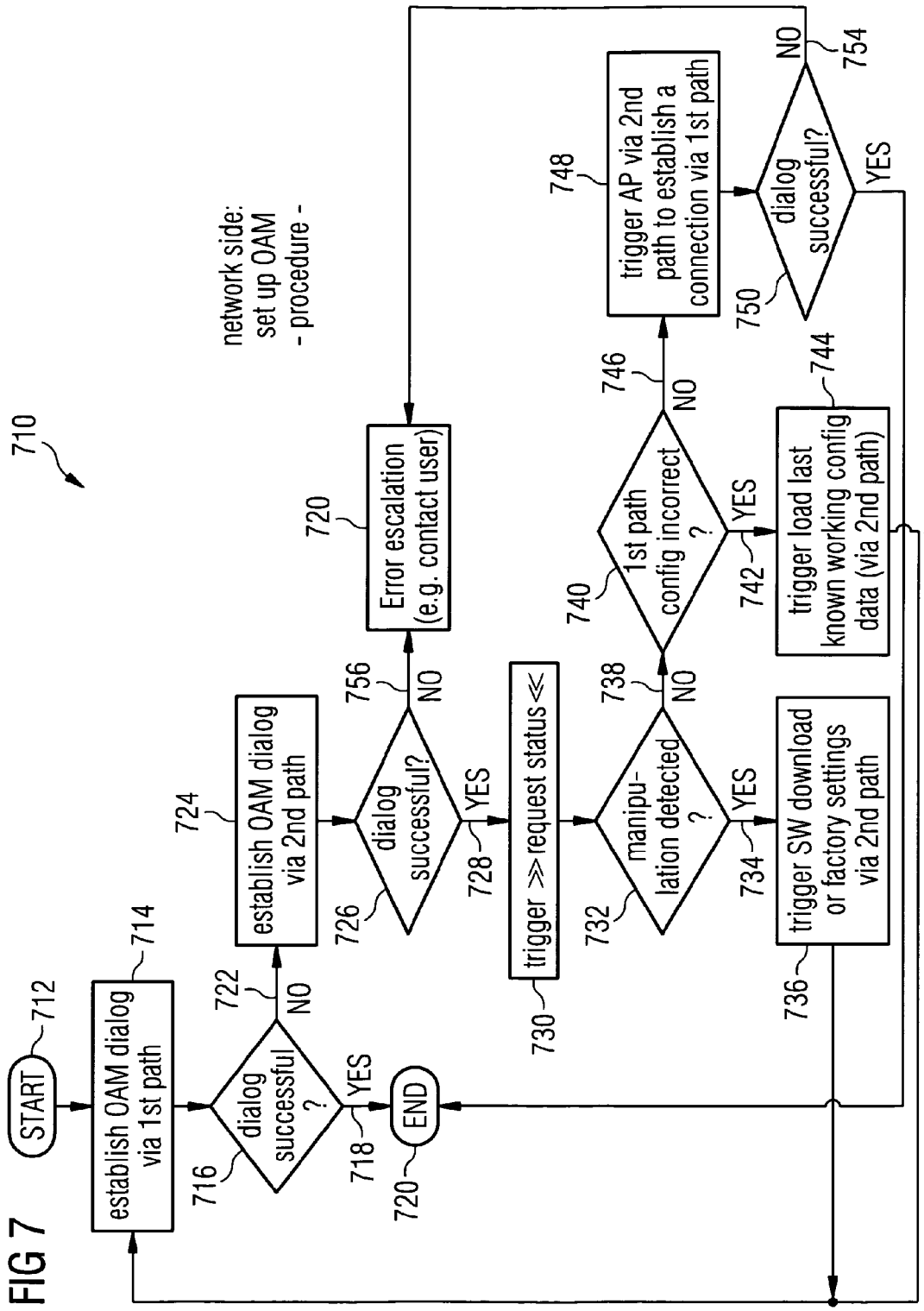

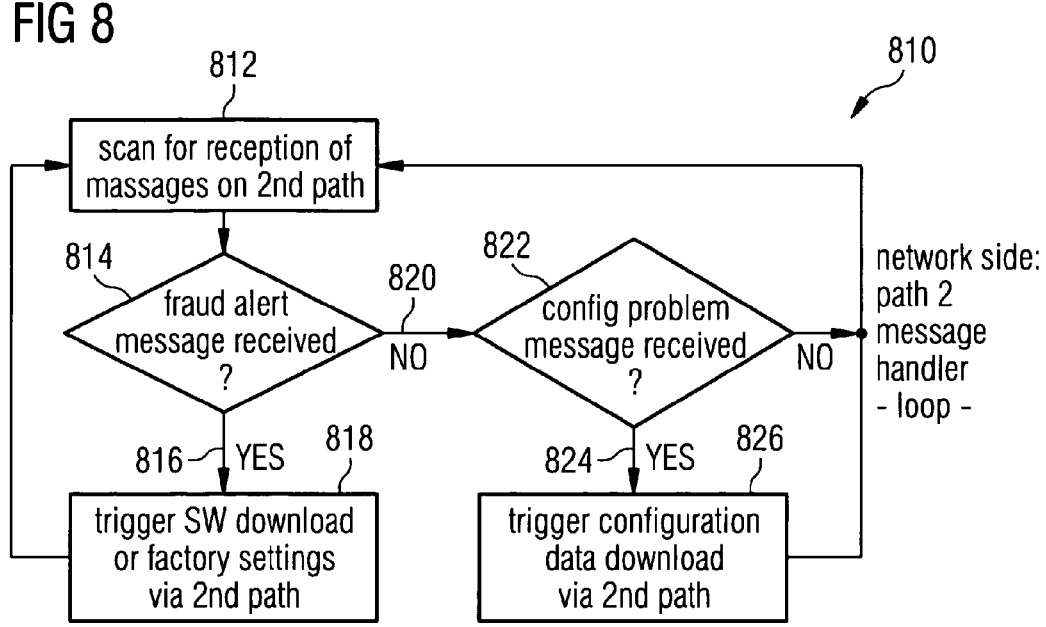
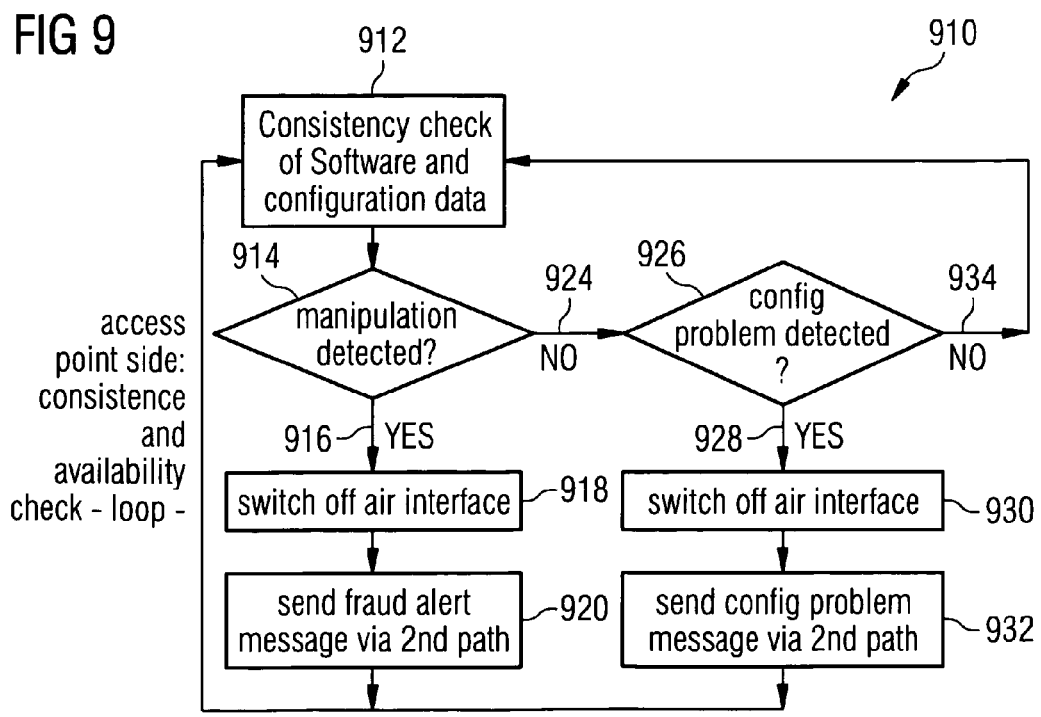

METHOD OF SUPERVISING A NODE IN A COMMUNICATION SYSTEM

This invention relates to a method of supervising a node in a communication system. It is particularly, but not exclusively, related to a management system in a mobile network controlling a network element.

As time passes, the roles performed in telecommunications and information technology (IT) by access providers, transport providers and service providers are becoming less well defined and in some cases roles may be mixed or overlapping. However, there still tends to be a relatively clear differentiation between a Fixed Network Operator (FNO), also referred to as a Fixed Network Provider and a Mobile Network Operator (MNO), also referred to as a Mobile Network Provider. Most commonly, fixed network operators offer wire-line access to the Internet with voice becoming more and more an addendum to a broadband wire-line subscription. Mobile networks offer anywhere access for voice calls with broadband data access becoming more and more popular for mobile users.

In many cases of fixed broadband connections, the fixed access provider equips home users with specific devices enabling a home user to utilise the operator's network for Internet and voice access while not exposing to the home user the specifics of the access technology. Typically, a user is provided by the fixed network operator, or an associated entity, with an access router (such as a residential gateway) which comprises an Ethernet switch with commodity functions such as a Dynamic Host Configuration Protocol (DHCP) server for the user's local home network (local area network, or LAN, part) and a modem part suitable for given physical access, for example a Digital Subscriber Line (DSL) modem (wide area network, or WAN, part). This way, the user has access which offers commodity LAN access to the outside world with the transport technology not being apparent.

In a competitive telecommunications provision environment, it is common for a fixed network provider to offer mobile network services and a mobile network provider to offer fixed network services to encourage users from other types of network to subscribe to these offered services:

fixed network providers implement voice services providing a degree of mobility although not necessarily based on cellular technology; and mobile network operators offer a wireless DSL-service to provide relatively fast digital data transmission over a cellular network.

Although these services may be provided in a conventional way, for example a fixed network operator may provide access to a cellular mobile network, services may be provided over a network which are a mixture of different network capabilities:

(i) In the UMA (universal mobile access) approach, the wireless LAN (WLAN) interface (which is included in nearly every access router) is utilised and it tunnels the whole 2G/3G protocol suite over WLAN/DSL/Cable to the core network of an MNO and therefore offloads traffic from a cellular network to a home WLAN/DSL/Cable network. A disadvantage of this approach is that the WLAN radio interface is not under the control of the MNO and so there may potentially be service provision and quality problems. Also, the cellular terminal devices which are used to communicate via the UMA device are required to have a WLAN interface and sophisticated cellular/WLAN interworking.

(ii) In another approach, a domestic cellular base station is used connected via for example ISDN (integrated services digital network) for local voice calls.

Neither of these approaches have been widely adopted. However, there is a newer approach which is currently being standardised. It is the idea of using a so-called Femto access point which offers native 2G/3G/LTE (long term evolution) radio access to users while they are at home. The traffic is either tunnelled to the operator core or directly off-loaded to the Internet using a subscriber's existing DSL access. By using Femto access points:

the MNO may offload traffic from the core network using the fixed network operators' network;

the greater home access exists, the fewer public macro base stations need to be deployed saving site costs and operational costs; and frequencies can be (re)used more efficiently.

All of the approaches discussed in the foregoing require the utilisation of an existing wire-line access, whether or not the fixed network operator is aware of this.

FIG. 1 shows a home network containing a Femto access point. The network provides connectivity to various terminal devices, such as notebooks/personal computers, WLAN phones, and peripheral devices such as a printer. The terminal devices are connected directly to an access router or are connected through further Ethernet based infrastructure devices, such as an Ethernet switch (not shown) or a WLAN access point. The most common general transport interface is Ethernet (LAN) and thus equipment present in a home network tends to be a hub, a switch, a bridge, or a host, having Ethernet as a lower transport layer. The Femto access point is directly connected to the access router.

Femto access points are typically connected to customers' home network as a standard access point, and from the perspective of the home network is considered to be an Ethernet bridge, switch, or host.

Many applications on different devices and elements in the home network run on top of the Internet protocol (IP), and therefore most of the equipment will, on top of Ethernet, run IP sockets in their base software (except in the case of pure Ethernet infrastructure devices such as Ethernet switches). Most commonly, a network layer address (IP address) is assigned to those devices dynamically to allow applications to communicate within the home network, for example by use of a browser communicating over a LAN, or to applications outside the home network, for example web browsing of a Hypertext Transfer Protocol (HTTP) server over a WAN.

To allow dynamic assignment of IP addresses, the Ethernet-connected devices in FIG. 1 typically comprise a DHCP client functionality (not shown) which communicates with a DHCP server typically integrated into the access router, indicated as DHCP. This DHCP server keeps a list of all devices that are connected in the home network and assigns IP addresses upon request. It should be noted that it does not assign an IP address to mobile terminals connected to the Femto access point since firstly the home network only sees the Femto access point and not the mobile terminal connected to it and secondly assignment of relevant addresses/identifiers to mobile terminals is carried out by the appropriate cellular mobile network.

The major task of the access router is to map/mediate between the internal home network (LAN) and the external (WAN) network, also referred to as an access network. While in nearly all cases the home network is based on Ethernet technology, the external network may be based on a number of technologies. Most commonly, the external network is based on a DSL network, a cable (TV) network, a PON (passive optical network) and/or a satellite network. Therefore, the access router interworks with different entities in the external network depending on the set-up of the external network. For example, in the case of FIG. 1, the external network is a DSL network and the access router interworks with a broadband remote access server (BRAS). The access router transfers the payload (IP packets) from the home network to the external network leaving the home network unaware of the access network transport specifics. The access router acts as an authentication client towards the network. In FIG. 1 it is authenticated via the BRAS, although it may be authenticated by an authentication, authorisation, and accounting (AAA) server (not shown).

These days, access routers are small, easy-to-use, and have a commodity-like nature. Users have the choice between a variety of access routers with integrated functions The home network also contains various other commodity-like equipment types and functionalities such as such as DHCP servers, firewalls, a WLAN access point (integrated into the access router), and print servers.

In order to provide the interworking/mediation for payload (IP packet) transfer, a network access translation (NAT) function typically performs interworking in such a way that one public IP address interworks with numerous internal IP addresses (which had been assigned, for example by an internal DHCP server function). In order to make this possible, outgoing IP packets are supplied with an internally unambiguous port number, and incoming IP packets are mapped to the appropriate internal IP address which can be identified by this port number.

Another access router function is a firewall (FW). The major task of a firewall is to prevent an external attack from the outside world to the user network. Typical attacks work in a way that external devices challenge the user network by "testing" open ports to find a way to intrude into the user network. The firewall can be configured in a way that it does not allow incoming/outgoing packets that do not comply with defined rules, for example defined in terms of ports and source IP-addresses. Although most users do have firewalls on their devices (for example notebooks), it is becoming common for access routers to also have firewall functionality. However, having only a single instance of a firewall in the network has the advantage that it needs to be configured only once per network and not once per device.

Femto access points tend to be connected in a way that communications with the relevant mobile network crosses several networks which are not under the control of mobile network operator, especially:
  the user home network
  wire-line access network (DSL, PON, and/or cable).

Therefore, it can be seen that a network element is seeking to communicate with a controlling network by which it is controlled over an intervening network which is not under the control of the controlling network. As a result, in some cases control messages and/or information messages which are to be transferred between the network element and the controlling network may be blocked by the intervening network. Both the home network and the wire-line access network, but particularly the home network, are apt to be mis-configured such that problems are caused in communication. For example, in a case in which the network element is a Femto access point, the controlling network is a mobile network, and the intervening network is a home network (in which case this is referring to a network in which the network element is located), a firewall present in the home network may be mis-configured such that it blocks the transfer of control messages and/or information messages which are transferred between the network element and the controlling network. In the case in which the network element is controlled by an operation, administration, and maintenance (OAM) system in the controlling network, for example the mobile network of an MNO, this may block OAM related messaging. OAM systems typically control a number of elements and functionalities of a mobile network including base stations, both Femto access points and conventional BTS base stations.

Not all mis-configuration is inadvertent. A Femto access point is part of the home IT infrastructure and an advanced user may desire to modify, self-optimise or simply just "play around" with it. In some cases, the advanced user carries out actions which might cause wider network problems, for example by choosing operating frequencies which are incompatible with the cellular network environment around the Femto access point. In order to set and maintain a deliberate mis-configuration, the advanced user may configure the home network, for example the firewall, to prevent the OAM system accessing the Femto access point.

The mis-configuration may not be present in a home network but may instead be present in an access network.

In a best case, the controlling system, for example the Femto OAM system, will recognise or have had reported to it that there is a mis-configuration or there is an attempt to mis-use the network. However, if the logical connection between the OAM system and the Femto access point has been severed or is not working, whether as a result of inadvertent failure or of deliberate mis-use, it may be impossible for the OAM system to take appropriate action. For example, a user may intentionally switch off or block a link between the Femto access point and the OAM and run the Femto access point at frequencies they have chosen themselves. If the configuration of the Femto access point has not been controlled by the OAM system, the output of the Femto access point may disturb adjacent cells.

One way to deal with this problem is for a Femto access point to switch itself off if there is no connection with the OAM system. For example, its firmware and hardware could be provided in a protected read-only portion of the Femto access point. However, this would also disable those Femto access points that do not have an OAM connection due to, for example, mis-configuration of a firewall, which could be the case in the majority of non-working access point-OAM system connections.

A typical example of how Femto access points may be inadvertently excluded from communicating with their OAM system is given in the following.

In order for Femto access points to fit readily into an existing home infrastructure it is intended for them to be an Ethernet based element (either as a bridge, a switch or a host). They may comprise DHCP client functionality in order to obtain assignment of one or more IP addresses.

The operation of a home network, beyond a very surface level, is usually too complex for a typical user to understand. Configurations of DHCP servers, defining rules for NAT traversal and sophisticated configuring of firewalls is usually outside a typical user's ability. In most cases a user will live with factory settings and be happy simply that the network works. Most users do not even know that their access router has an active firewall.

Standard devices, for example terminal devices such as notebooks, interact with the home network in relatively straightforward ways. For example, in the majority of cases, browsing by using HTTP and email are the only applications that talk to external servers, and access routers are pre-configured to handle this. Printers may be the only devices used within the home network. Peer-to-Peer applications may require some user modification, but these tend to be employed by more experienced users.

A Femto access point requires more delicate interworking: it is likely, more than one IP address will be used; and the access point must be addressable from outside for configuration issues.

There are many reasons why the communication between a Femto access point and the peer end, for example an OAM system, in the network fails. One reason may be a firewall configuration set deliberately to prevent an OAM system having access to a Femto access point and thus preventing it exercising control over its configuration and/or operation.

FIG. 2 shows a generalised system in which a communication problem caused by blocking in an intervening element is described. A device 1 and a device 2 form a home network that is controlled by an access mediator (AM). The device 1 is a terminal device such as a notebook, the device 2 is an access point, the AM is an access router and may include a traffic selector function such as a NAT and a firewall. The devices may want to connect to a device 3 such as an HTTP server in the Internet and a device configured to commit a fraudulent act (the fraud device) may seek to intrude into the home network. The traffic selector, for example the firewall, should be configured in a way that all outgoing traffic is allowed but incoming traffic is only allowed for the device 3 or device 3 type of devices. Thus attempts of the fraud device to intrude (for example by using port ping) will be blocked by the traffic selector.

FIG. 3 shows a set-up similar to the system of FIG. 2 with a typical conflict case. A device 1 (a notebook) is normally used to do web browsing. The user, or a configuration software shipped with a device, for example an access router/access mediator, may configure a firewall to let only HTTP traffic pass through (on port 80). An external device 3 (for example a management system for access points) that uses a distinct port to address the device 2 will then be excluded from communication. The situation becomes a particular problem if communication is possible in one direction, from the device 2 to the device 3 but not vice versa. A situation may arise where the access point has nothing to report to a management system (since it is working properly) but the management system needs to distribute an urgent update but cannot reach the access point.

Although a brute force solution may be applied, that is whenever a malfunction is detected, a device which cannot be reached switches off automatically, this is generally unacceptable because the majority of improperly working access points may be unreachable as a result of inadvertent, rather than malicious, action.

Problems related to NAT/shortage of IP4 address range/mis-configured firewalls are well known and there exist many workarounds, for example the well-known "hole-punching" mechanism of Skype (http://www.h-online.com/security/How-Skype-Co-get-round-firewalls--/features/82481). However, a workaround tends to use/misuse typical specific behaviours of implementations of NAT/firewalls, for example by relying on the fact that port numbers are assigned sequentially or arbitrarily, and so if a system in which the workaround is being used is upgraded, for example a new version of a firewall is installed, the workaround may no longer work.

According to a first aspect of the invention, there is provided a method of supervising a node in a communication system, the communication system comprising a supervising entity, a node under the supervision of the supervising entity, and a first communication path between the node and the supervising entity, the method comprising the steps of:

determining that the node is unable to receive communications sent by the supervising entity via the first communication path; and triggering the node to send a message to the supervising entity to initiate a maintenance procedure.

Preferably, the message comprises sending a trigger message to the node to initiate a communication path set up on the first communication path towards the supervising entity.

Preferably, the method comprises establishing a second communication path between the node and the supervising entity. The trigger message may be sent on the second communication path.

Preferably, following receipt of the trigger message, communication between the supervising entity and the node is established via the first communication path. Thus it will be understood that communication is (re-)established on a communication path hitherto has not been functioning correctly.

The communication system may comprise different parts, for example different networks, under the control of different entities. The node may be controlled by a network operator but located in a network which is not under the control of that network operator. The network operator may control the supervising entity.

Preferably, the first communication path is a communication path within a first network. Preferably it extends via an access network. The access network may be a broadband network. Preferably, the second communication path extends via a second network. The second network may be an operator network providing services to subscribers. It may a mobile network. It may be a cellular mobile network. Preferably, the second communication path is established between a radio access network of a mobile network and the node.

Preferably, the supervising entity establishes a secure communication link with the node over the second communication path.

Preferably, the supervising entity is in a mobile network and is capable of controlling a network element of the mobile network.

The first and second communication paths may be based on different communication technologies, such as cellular and DSL. They may be established on different communication protocols. They may be established on different instances of the same communication protocol.

The first communication path may be bi-directional. The second communication path may be bi-directional.

The first communication path may be a default communication path used in the supervising entity exercising control over the node.

The node may be present in a home network. The supervising entity may be present in another network.

The node may be an access point. Preferably, it is a Femto access point.

The node may be connected to an access mediator. The access mediator may be configurable such that it can prevent communication between the node and the supervising entity. It may prevent the node receiving messages from the supervising entity along the first communication path. Communication in the opposite direction along this path may be permitted.

Preferably the node contains wireless functionality which enables it to establish the second communication path with the supervising entity.

The node may be capable of setting up a secure connection with the supervising entity.

The supervising entity may be capable of setting up a secure connection with the node. This may be a wireless connection. This may be the second communication path.

The supervising entity may be within a management system of an operator network, or it may be the management system itself. It may be an operation, administration, and maintenance system in a controlling network.

Preferably, the node provides connectivity/access to terminal devices such as a mobile phones, cellular-enabled laptops, and notebooks.

The supervising entity may send a trigger message to the node. The trigger message may be a short message service (SMS) message. The trigger message, when received by the node, may cause it to send a response message to the supervising entity. The trigger message may be sent via the second communication path. The response message may be sent via the first communication path. The trigger message may contain connection parameters to be used by the node in responding to the supervising entity. Sending of the response message may identify and/or open a port which is then useable by the supervising entity in subsequent communication.

The response message may punch a hole through a firewall. Receipt of the response message may indicate to the supervising entity that a particular port is open. The supervising entity may then be able to send messages on the particular port to the node via the first communication path.

The supervising entity may send instructions, commands, or notifications to the node via the second communication path.

The invention may be implemented by providing a number of state event handlers. There may be a handler to run a set-up procedure running in the supervising entity. There may be a message handler loop in the supervising entity. There may be a consistency and availability check loop running in the node.

The supervising entity may try to establish communication with the node over the first communication path. If this is not successful, it may try to establish communication with the node over the second communication path. It this is successful the supervising entity may request the node to carry out a self-check to generate status information relating to data integrity and configuration settings. The status information may then be sent to the supervising entity. The supervising entity may evaluate the status information to determine whether there has been potentially harmful manipulation of the node, whether configuration settings of the node are correct, or whether there is no obvious reason for failing to establish communication over the first communication path. If this is not possible, the supervising entity may determine that the node needs to be repaired or replaced.

The supervising entity may continually poll the second communication path for messages from nodes.

The node may continually check its software and configuration settings for data integrity and configuration problems.

Preferably, the supervising entity is carrying out a maintenance procedure in respect of the node. The maintenance procedure may be initiated by an event, for example an inability to carry out communication between the supervising entity and the node.

A response message may cause the supervising entity to initiate the maintenance procedure. Preferably, execution of the maintenance procedure at the supervising node is carried out upon reception of the response message.

Preferably, sending the trigger message on a second communication path is used to re-invoke bi-directional communication on the first communication path.

Preferably, the first communication path is used for bi-directional communication between the supervising entity and the node in normal operation but, because of a problem, is temporarily working in a uni-directional manner only, in a direction from the node to the supervising entity. Sending a response message from the node to the supervising entity on the first communication path may re-establish bi-directional operation on that communication path.

Preferably, a second communication path is used only for the purposes of triggering the maintenance procedure if the second communication path is considered be insecure. If the second communication is considered to be secure, then additional communications related to carrying out the maintenance procedure may be carried out over that path rather than over the first communication path. For example, the second communication path may be used to transfer configuration settings, software code or instructions, commands or instructions, or any other relevant message.

Preferably, the node continually performs a consistency check of configuration data and executable program code. The node may report inconsistencies to the supervising entity using the first communication path by default and the second communication path in case the primary communication path is not available or useable.

Preferably, the supervising entity enforces a factory reset of the node in case a fraudulent manipulation is detected and/or reported. Alternatively, the supervising entity may cause the node to fall back to factory settings. In any case, the supervising entity may respond to a determination that the node has been deliberately tampered with to provide it with an unauthorised configuration by carrying out a reset operation on the node which means that it contacts the supervising entity in a way which indicates to the supervising entity that the node is back under its control.

Preferably, the supervising entity and the node work in a master/slave manner.

According to a second aspect of the invention there is provided a communication system comprising a supervising entity, a node under the supervision of the supervising entity, and a first communication path between the node and the supervising entity, the supervising entity comprising:

a monitoring entity capable of determining whether the node is unable to receive communications sent by the supervising entity via the first communication path;

a triggering element capable of triggering the node to send a message to the supervising entity to initiate a maintenance procedure; and a primary communication path element capable of establishing communication between the supervising entity and the node via the first communication path.

Preferably, the supervising entity comprises an auxiliary communication path element capable of establishing a second communication path between the node and the supervising entity.

According to a third aspect of the invention there is provided a supervising entity capable of supervising a node in a communication system over a first communication path between the node and the supervising entity, the supervising entity comprising:

a monitoring element capable of determining whether the node is unable to receive communications sent by the supervising entity via the first communication path;

a triggering element capable of triggering the node to send a message to the supervising entity to initiate a maintenance procedure; and a primary communication path element capable of establishing communication between the supervising entity and the node via the first communication path.

According to a fourth aspect of the invention there is provided a node capable of being supervised by a supervising entity in a communication system over a first communication path between the node and the supervising entity, the node comprising:

a primary communication path element capable of receiving communications from the supervising entity via the first communication path; and the node being capable, on being triggered by the supervising entity, of sending a message to the supervising entity to initiate a maintenance procedure.

Preferably, the node comprises an auxiliary communication path element capable of receiving communications from the supervising element via a second communication path.

According to a fifth aspect of the invention there is provided a computer program product comprising software code that when executed on a computing system performs a method of supervising a node in a communication system, the communication system comprising a supervising entity, a node under the supervision of the supervising entity, and a first communication path between the node and the supervising entity, the method comprising the steps of:

determining that the node is unable to receive communications sent by the supervising entity via the first communication path; and triggering the node to send a message to the supervising entity to initiate a maintenance procedure.

Preferably, the computer program product has executable code portions which are capable of carrying out the steps of the method.

Preferably, the computer program product is stored on a computer-readable medium.

According to a sixth aspect of the invention there is provided a method of supervising a node, the node having a default escalation level in which no problems are detected, the method comprising:

moving the escalation level of the node to a higher escalation level if a problem is detected;

determining whether the problem is caused by an inadvertent mis-configuration or by unauthorised settings having been applied to the node;

in the event that the problem is determined to have been caused by an inadvertent mis-configuration, resolving the problem by applying a correct configuration to the node;

in the event that the problem is determined to have been caused by unauthorised settings, moving the escalation level to a yet higher escalation level, and resolving the problem by replacing the unauthorised settings with authorised settings; and moving the escalation level back to the default level.

The problem may be that a supervising entity may not be able to communicate with the node.

Preferably, the node provides connectivity in a communications network.

Preferably, if the problem cannot be resolved, the escalation level is moved to an even yet higher escalation level and the node is prevented from providing connectivity.

Accordingly, the invention provides an escalation level scheme.

The escalation level scheme may comprise a default escalation level which is maintained if no problems are detected. This may be a lowest escalation level. There may be a higher escalation level which is set if irregular behaviour is determined. There may be an even higher escalation level which is set if there is a determination of fraud or deliberate tampering with the node. There may be an even yet higher escalation level which is set if there is a determination that the node is out of the control of the supervising entity.

At an escalation level indicating that there is a problem, the node may carry out a self-check procedure. The self-check may generate information about the integrity of the software in the node. The self-check may generate information about the configuration of the node. In one embodiment of the invention, the self-check causes the node to send configuration information relating to the node to the supervising entity.

The supervising entity may classify the reason for the failure of communication. This may relate to a primary communication path.

According to further aspects of the invention, there is provided a communication system, a supervising entity, a node, and a computer program product in accordance with the sixth aspect of the invention.

Preferably, the first communication path is a communication path within a first network. Preferably it is within an access network. It may be within a broadband network. Preferably, the second communication path is a communication path within a second network. Preferably it is within an operator network providing services to subscribers. It may be within a mobile network.

According to another aspect of the invention, there is provided a method of supervising a node in a communication system, the communication system comprising a supervising entity, a node under the supervision of the supervising entity, and a first communication path between the node and the supervising entity, the method comprising the steps of:

determining that the node is unable to receive communications sent by the supervising entity via the first communication path; and sending a trigger message to the node to initiate a communication path set up on the first communication path towards the supervising entity.

An embodiment of the invention will now be described, by way of example only, with reference to the accompanying drawings in which:

FIG. 7 shows a network-based state handler in flowchart form;

FIG. 8 shows another network-based state handler in flowchart form; and

FIG. 9 shows an access point-based state handler in flowchart form.

Figure 1:
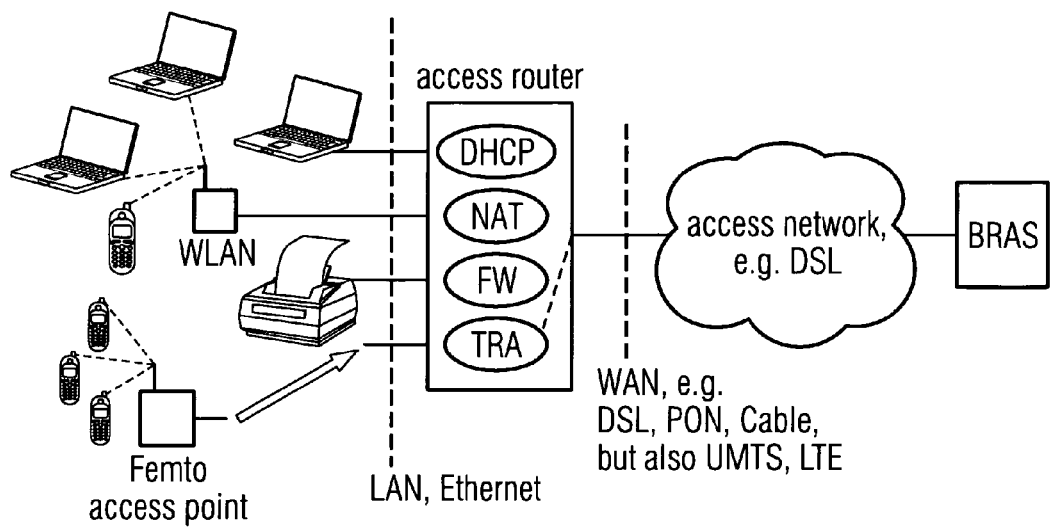
FIG. 1 shows a system having a home network containing a Femto access point.
Figure 2:
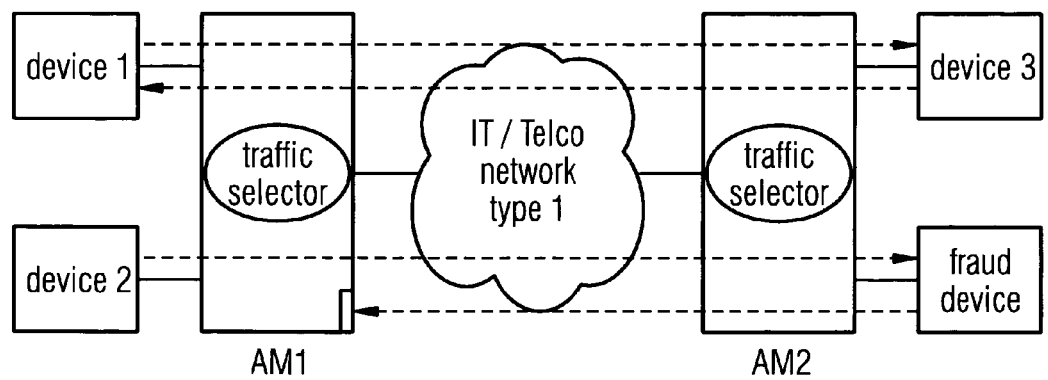
FIG. 2 shows a system in which an unauthorised device is attempting to gain access.
Figure 3:
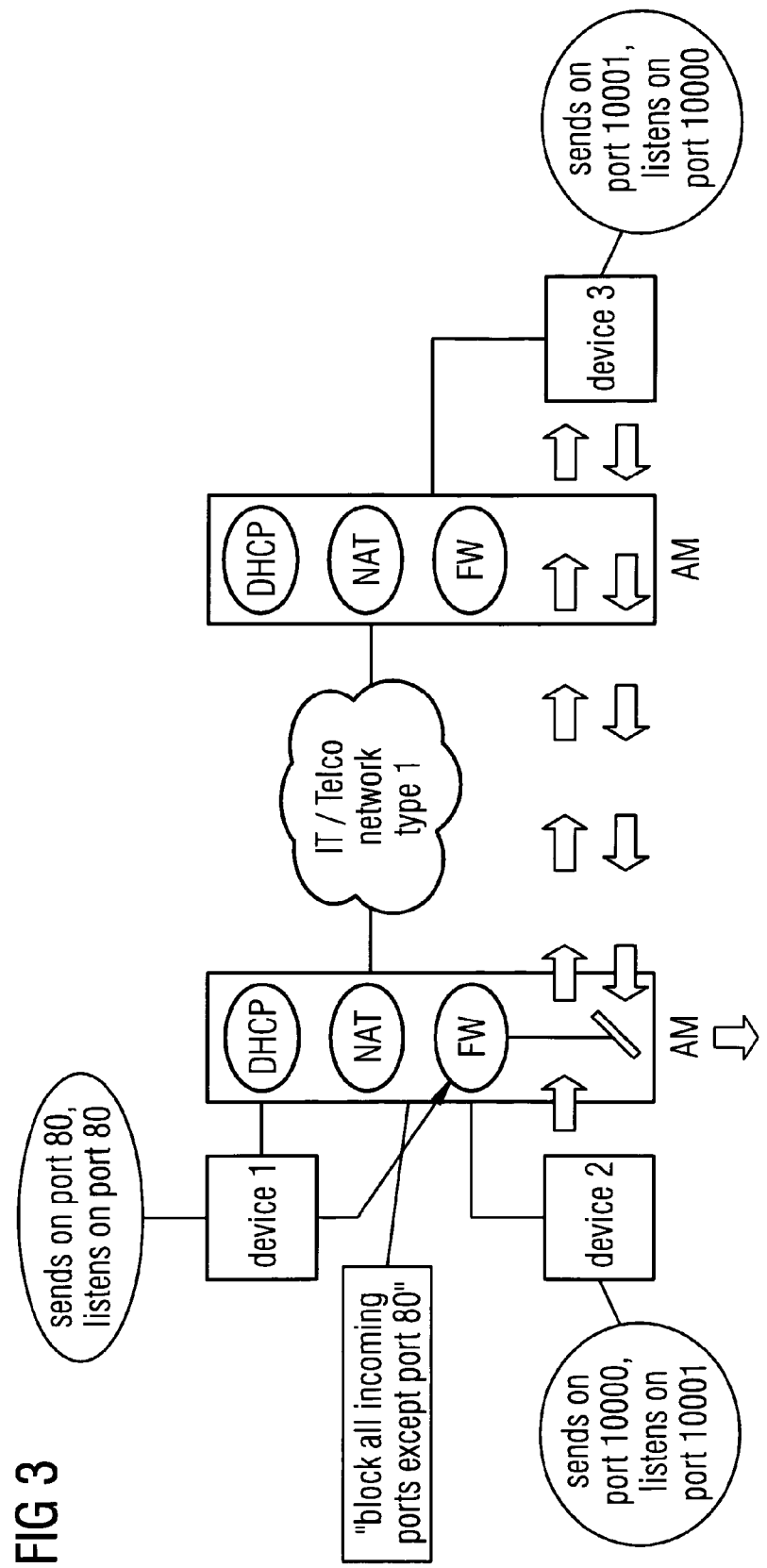
FIG. 3 shows a system in which equipment conflict causes blocking of communications.

FIGS. 1 to 3 have been described in the foregoing.

As has been described in the foregoing, a common failure condition in a system wherein a node or network element is under the control of a management entity while being located in another network is that the management entity may not be able to communicate with the node, for example in sending to it commands, instructions, and/or other messages. In a particular embodiment of a system, the node in the form of a Femto access point cannot be reached by an OAM system, for example to receive OAM commands.

Figure 4:
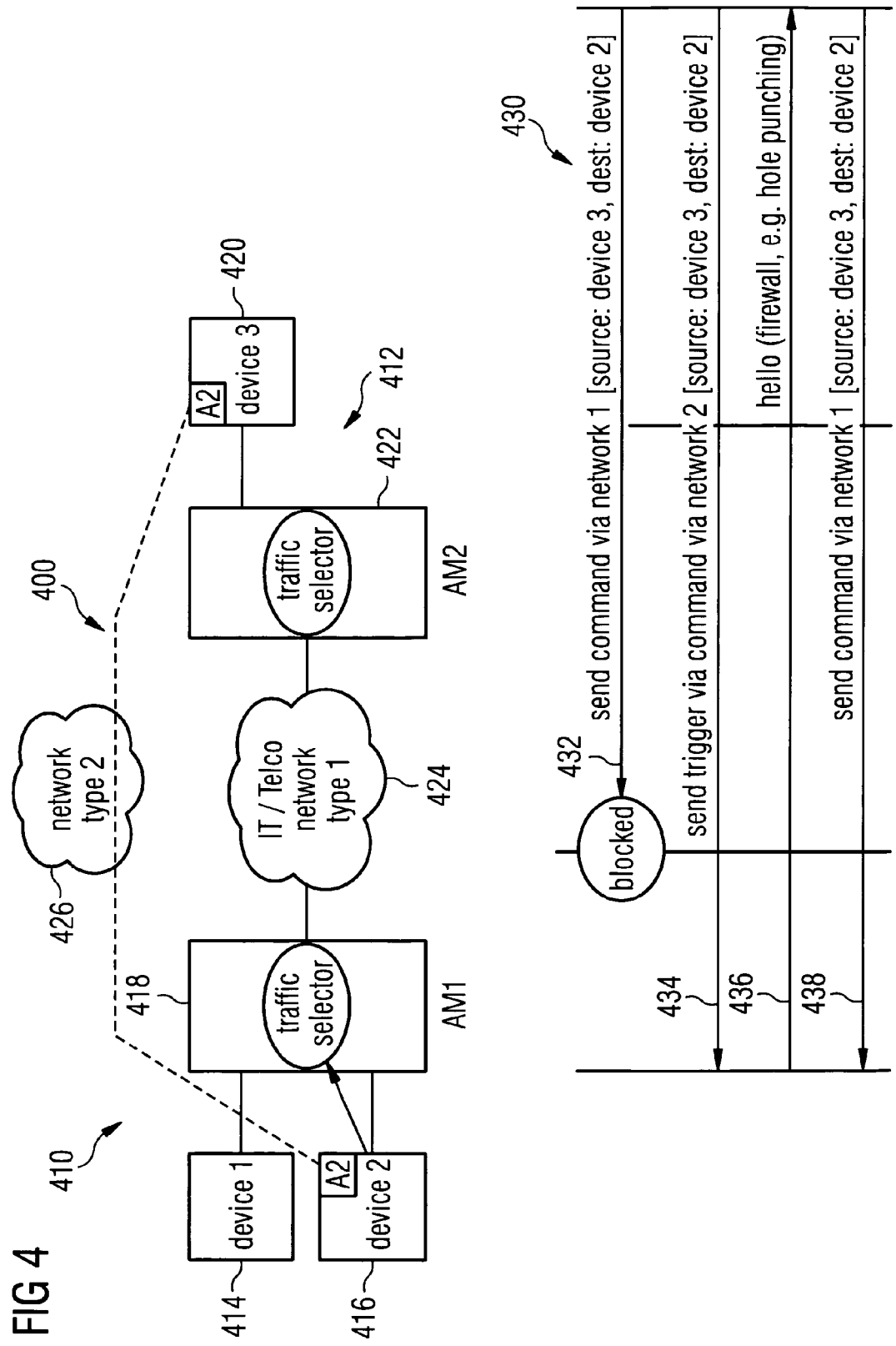
FIG. 4 shows a system having different communications paths.

FIG. 4 shows a system 400, which is configured similarly to that of FIG. 2, comprising a home network 410 and an operator network 412. The home network 410 comprises a device 1 414 and a device 2 416 and an access mediator (AM1) 418 which mediates access to and from the home network 410. The operator network 412 comprises a device 3 420 and an access mediator (AM2) 422 which mediates access to and from the operator network 412. The home network 410 and the operator network 412 are connected by an access network 424 which is a telecommunications and/or IT network referred to as a type 1 network.

In the embodiment of the invention being described, the device 1 414 is a terminal device such as a notebook, the device 2 416 is a Femto access point, and the access mediators 418, 422 are access routers and include a traffic selector function such as a NAT and a firewall. In this embodiment, the operator network 412 is a mobile network and the device 3 420 is an entity present within an OAM system in the mobile network. The device 3 420 is connected to the access mediator AM2 422. In a particular embodiment of the system, the device 2 416 is a home (enhanced) node B, or a H(e)NB. The OAM system supervises the operation of the device 2 416 and is able to carries out tasks such as carrying out maintenance procedures in respect to the device 2 416, for example to modify or repair its configuration.

The access mediator AM1 418 may be configured in a way that all outgoing traffic is allowed but incoming traffic is only allowed for certain kinds of devices such as HTTP servers and email servers. However, it may not be configured to allow incoming traffic from a device in a management system for example the device 3 420. If it is configured in this way, it may block attempts made by the device 3 420 to communicate with the device 2 416. As a result, the device 3 420, and thus the OAM system of which it is a part, may not be able to communicate with the device 2 416 and the OAM system may register an error event in respect of the device 3 420 because an indication is generated that there is a "node is not reachable" event.

In addition to the type 1 network 424, the home network 410 and the operator network 412 are connected by another network 426 which is referred to as a type 2 network. In the embodiment currently being described, this is the wireless part of the mobile network in which a communication path can be established between a radio access network of the mobile network and the device 2 416. Accordingly, the device 2 416 can be reached by the device 3 420 by means of the type 2 network 426.

According to the invention, it is recognised that in modern communication systems having a number of different types of networks linked together, for example a home network, an access network, an operator network, some of which may be wired networks and some of which may be wireless networks, with the wireless networks possibly being either cellular or non-cellular in nature, there may be more than one communication path available between one node, system, or sub-system and another node, system, or sub-system. In the event that a primary communication path which is used normally for communications between a management system and a managed node is not available, an alternative, or auxiliary, communication path may be used instead. Therefore, to deal with a "node is not reachable" problem via the primary communication path used in normal operation, an auxiliary communication path different to the primary communication path is used to trigger a communication set-up operation which re-establishes communication over the primary communication path.

Applying the foregoing to FIG. 4, the situation is that a firewall is present in the access mediator AM1 418 which prevents the device 3 420 from reaching the device 2 416 via the type 1 network 424. Once this happens, the device 3 420 registers an event indicating that there is a problem, and that a maintenance procedure needs to be initiated.

The device 2 416 is still able reach device 3 420 over the type 1 network 424. Therefore, in order for the device 3 420 to establish a communication path to enable it to send commands and other messages to the device 2 416, the device 3 420 uses the auxiliary communication path, that is a communication path established in the type 2 network 426, to trigger the device 2 416 to initiate a communication towards the device 3 420 via the type 1 network 424. In this way, if it is determined in the device 3 420 that a problem is preventing communication from the device 3 420 to the device 2 416, the device 3 420 uses the type 2 network 426 to create an auxiliary communication which is used to cause the device 2 416 to set up (or re-establish) a primary communication path over the type 1 network 424. In other words, the device 3 420 remotely triggers the setting up of the primary communication path, that is a remote trigger causes the initiation of a maintenance procedure. As is made clear in the following, the primary and auxiliary communication paths may be based on different communication technologies, such as cellular as opposed to DSL. However, they may be different communication protocols or even different instances of the same communication protocol.

The message flow associated with this procedure is shown in a message flow diagram 430 presented under the system diagram of FIG. 4. In a first communication step 432, the device 3 420 tries to send a command to the device 2 416 over the type 1 network 424. The command is blocked. The device 3 420 then sends a trigger command 434 over the type 2 network 424 which triggers the device 2 416 to establish a connection via the type 1 network 424. In the case of the embodiment of FIG. 4, the device 2 sends a "hello" message 436 over the type 1 network 424.

The "hello" message is generated in the device 2 and, in sending it, the device 2 punches a hole through the firewall, that is the firewall opens the port on which the "hello" message is sent. Accordingly, the device 2 416, operating as a client makes a client-initiated request to the device 3 420, and as a result the device 3, on receiving the "hello" message on a particular port, is then able to use that port. The device 3 420 is therefore able to send messages 438 to the device 2 416 via the type 1 network 424 by a communication path which is based on the identified port.

Once the communication path is established, or depending on the circumstances re-established, the device 3 420 can send commands to the device 2 416.

Figure 5:
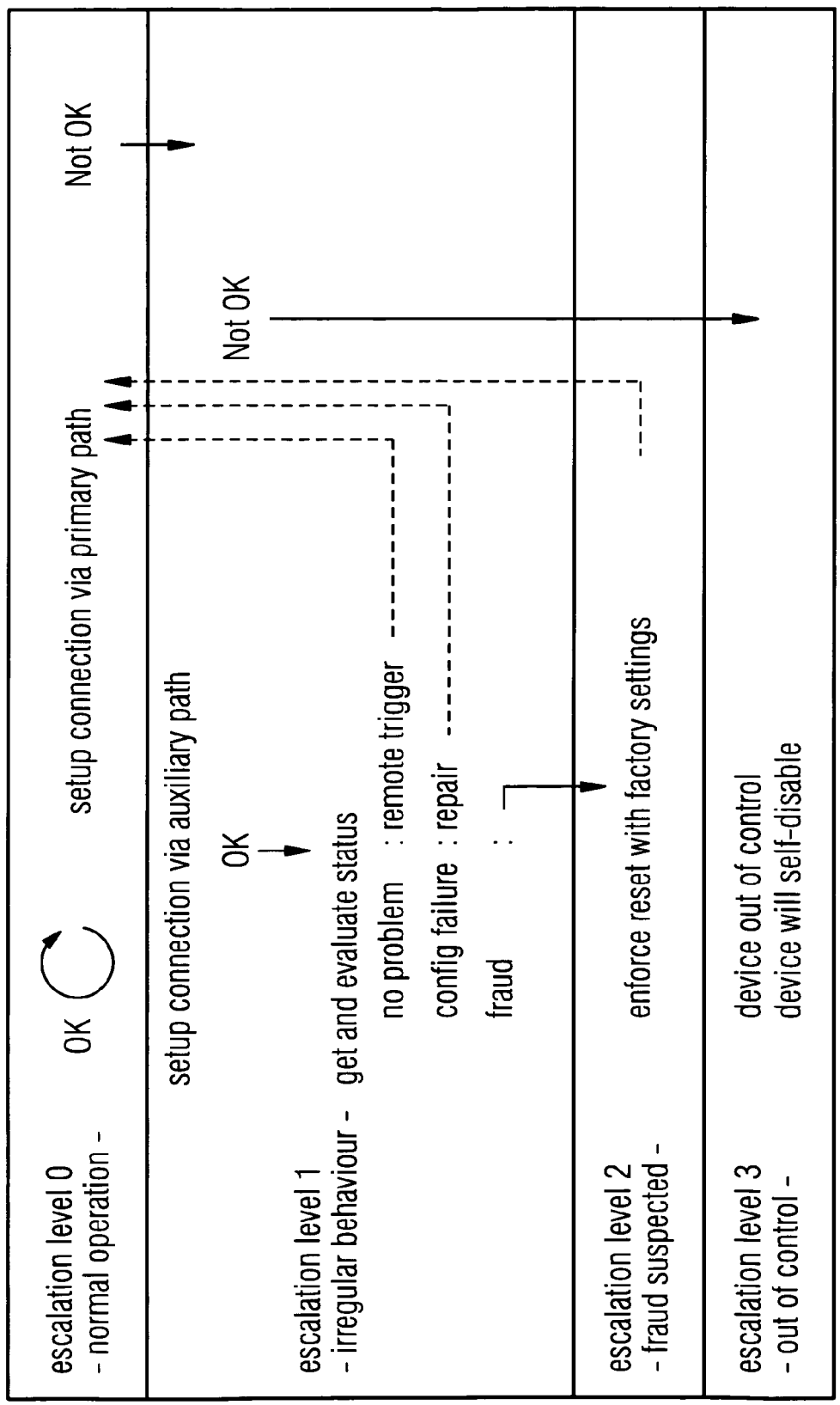
FIG. 5 shows an escalation scheme.

The (re-)establishment procedure message flow of FIG. 4 takes place in the context of a balanced escalation scheme which is shown in FIG. 5. This shows four escalation levels defined with respect to trustworthiness and reliability:

An escalation level 0: default level, no problems were detected, everything works as it should.

An escalation level 1: irregular behaviour, the reason for which is unclear although it is most likely caused by a mis-configuration.

An escalation level 2: fraud level, fraud has been detected, reported or is strongly assumed.

An escalation level 3: the node is out of the control of a management system.

As can be seen in FIG. 4, there are at least two different communication paths with which a node can be addressed by a controlling system. In an embodiment of the invention in which the node is a Femto access point, the primary communication path may be an end-to-end TCP/IP connection using standard DSL access, that is the TR-069 protocol. The primary communication path and is the default communication path. Another communication path is a secondary, that is, auxiliary or emergency communication path. In this embodiment of the invention, this path is based on a different access technology to that of the primary communication path. Although in a more detailed embodiment described in the following this is a cellular mobile based path, for example a path provided by a general packet radio service (GPRS) network, in a yet still further embodiment of the invention, it may be a different HTTP connection between the node and a controlling system such as an OAM system again using standard DSL access which is specifically configured to circumvent typical home environment problems such as firewalls. In this latter case, the node has a small web engine built in.

Relating now the system of FIG. 4 to the escalation levels of FIG. 5, during normal operation (at escalation level 0) a primary communication path is set up with the node to be controlled. While communication is possible over the primary communication path, the controlling system remains at this escalation level. In the event that the primary communication path set-up procedure fails, or an established primary communication path becomes severed, the escalation level moves from escalation level 0 to escalation level 1. At escalation level 1, an auxiliary communication path is set up. The controlling system then triggers a self-check procedure via this auxiliary communication path, which is executed by the node. The self-check generates information about the integrity of the software in the node and the configuration of the node and this information is reported to the controlling system using the auxiliary communication path. The controlling system evaluates this data and classifies the reason for the failure of the primary communication path, that is whether there is no problem preventing communication over the primary communication path, whether there is a configuration problem in the node which needs to be repaired, or whether a deliberate mis-configuration has been applied to the node, for example for fraudulent or otherwise undesirable reasons (from the perspective of a network operator).

If, following setting up the auxiliary communication path, it is determined that there is no internal problem within the node preventing communication over the primary communication path, the auxiliary communication path which has been set up is used by the controlling system to remotely trigger the node to (re-)establish communication over the primary communication path. Once the node has (re-)established contact with the controlling system, it is then able to control the node as normal according to the current node configuration.

In this case, it is likely that the home network was the source of the problem, for example a mis-configuration of a firewall.

If, following setting up the auxiliary communication path, it is determined that there is a configuration problem in the node which needs to be repaired, the auxiliary communication path which has been set up is used to (re-)establish communication over the primary communication path, and the node configuration is repaired. Such a configuration failure could be caused by the node having an incorrect IP address, URL, etc. The auxiliary communication path is then used to provide correct configuration information to the node which is applied to the node. The node is then able to (re-) establish communication over the primary communication path and the controlling system is then able to control the node as normal according to the new node configuration. It will be appreciated that the configuration settings being referred to may, in one embodiment of the invention, simply be communication-related configuration settings used to correctly connect to the controlling system.

Accordingly, in a method of the invention, a simplified command set is used to instruct the node to carry out operations such as resetting itself to default configuration values or to a last known working configuration.

In both of these cases, that is "no problem" and "configuration failure and repair", after having responded appropriately, the communication system is set back to escalation level 0.

If, following setting up the auxiliary communication path, it is determined that a deliberate, potentially harmful, configuration has been applied to the node, for example by determining that software or configuration parameters have been manipulated in a harmful way, the escalation level is set to 2 and the controlling system instructs the node to reset immediately to return its configuration data back to factory default settings. The configuration settings are either contained within the node or may be provided to the node by the controlling system. A reset operation involves the node contacting the controlling system (in particular that part of the controlling system handling the initialisation of nodes), announcing that it is a new node and as a result the controlling system is to provide the necessary software and/or configuration settings necessary to get the node working again.

In one embodiment of the invention, the operating system program code or part thereof, or a complete configuration file, needed for the node to function may be downloaded to it. The node may use a basic loader to download the code or the configuration file from the controlling system.

Determining that a deliberate, potentially harmful, configuration has been applied to the node may involve the node carrying out a checksum of its own operating system program and checking whether the result of the checksum is as expected. This is a useful way to perform such a determination if the node is in an isolated program space.

After power-up, the node is assumed to be at escalation level 0 although this may change to level 1 if there is a failure to set up a new primary communication path.

If it is not possible for the controlling system to carry out communication with the node, whether by using the primary communication path or the auxiliary communication path, the escalation level is set to 3 which is the highest level/worst case. In this case the node is assumed to be out of control and a node specific behaviour may take place, for example a node-initiated power down, and/or the node will self-disable.

According to the invention, although the node is not directly accessible by the controlling system, the controlling system is still able to exercise control over the node and does so by applying the escalation scheme described in the foregoing.

Figure 6:
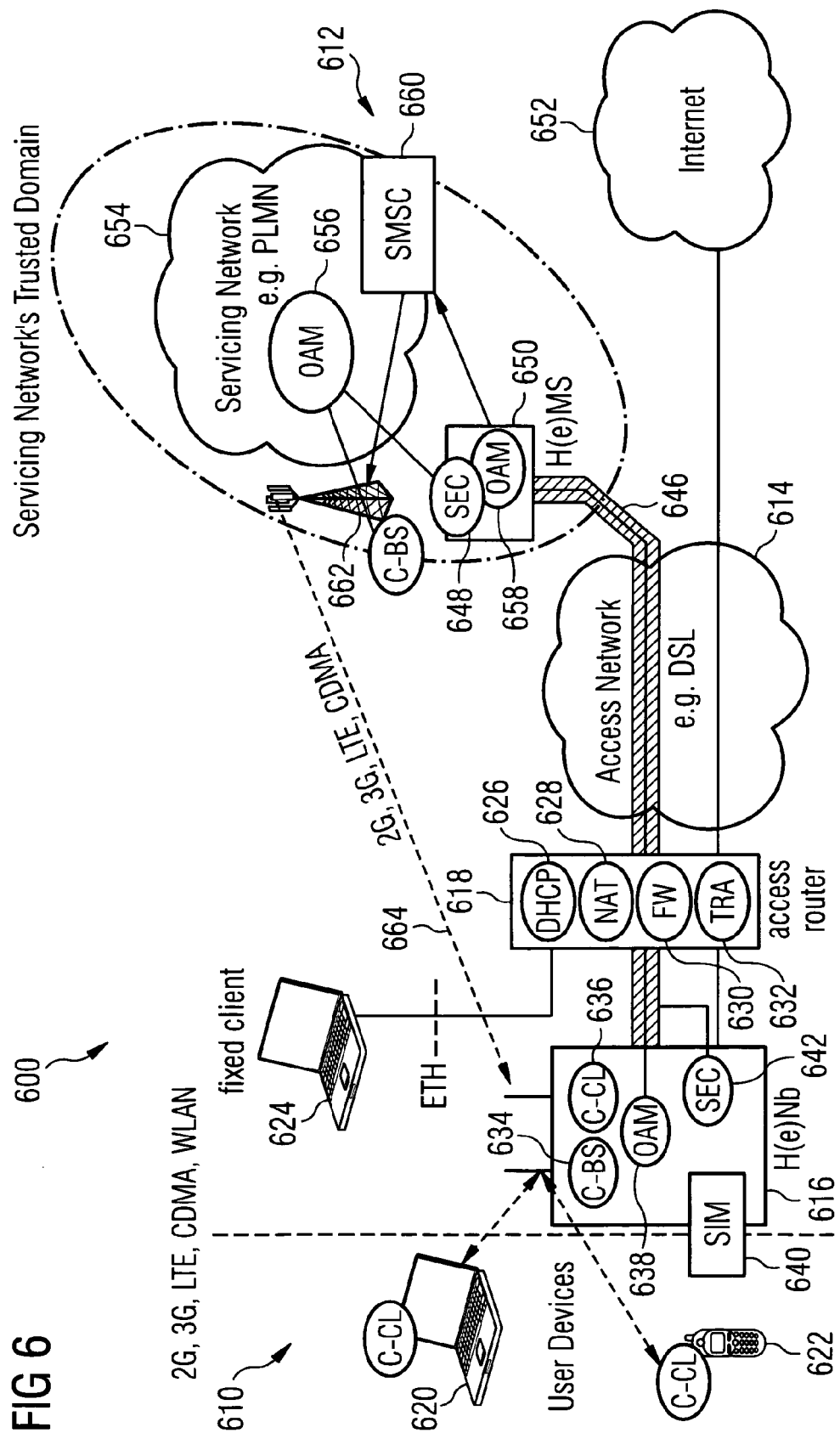
FIG. 6 shows a system according to the invention having a home network containing a Femto access point.

A specific implementation of the invention is shown in FIG. 6. This shows a system corresponding to the generic system of FIG. 4 but in greater detail.

FIG. 6 shows a system 600 comprising a home network 610 and an operator network 612. They are linked by an access network 614. In this case, the operator network is a mobile network, and in particular a cellular network. In this case, it is controlled by an MNO. The home network 610 comprises an access point 616 to which terminal devices may connect and an access mediator in the form of an access router 618 to which terminal devices may also connect (via an appropriate connection/access point such as LAN over Ethernet). The access router 618 mediates access to and from the home network 610. Various terminals devices are shown in FIG. 6 being a user device such as a laptop 620 or a mobile phone 622 connected to the access point 616 and a fixed user device 624 connected to the access router 618.

The access router 618 contains typical functionality for such a device, for example a DHCP server 626, a NAT 628, a firewall 630, and a traffic functionality TRA 632 which enables interworking between the home network and the access network.

In this embodiment of the invention, the access point 616 is a Femto access point and as such contains a cellular base station part (C-BS) 634 which enables the Femto access point to operates as a base station with respect to the terminal devices, a cellular client (C-CL) part 636, which is used by the Femto access point to establish a wireless connection with the operator network 612 over an air interface 664, an OAM part 638, a SIM 640 part (the SIM being necessary for the Femto access point to establish a cellular connection with the operator network 612), and SEC 642 functionality. The SEC 642 functionality is capable of setting up a secure tunnel 646 with a corresponding security gateway 648 associated with an OAM entity 650 (such as an OAM system) in the operator network 612. The OAM part 638 cooperates, on the part of the access point 616, with OAM control of the access point 616 exercised by the operator network 612.

The access network 614 provides connectivity of the access point either to the operator network via the secure tunnel 646 or the Internet 652. In this embodiment of the invention, it is a DSL network. Accordingly, in many implementations of the invention, the access network is not under the control of the operator of the operator network.

The operator network comprises a servicing network 654, such as a public land mobile network (PLMN), having an OAM system 656. This is not the same as the OAM entity 646 since the OAM system 656 cooperates with the servicing network 654 and the OAM entity 646 is part of a management system 658, in particular a home (enhanced) management system (H(e)MS), which controls Femto access points. In addition to the OAM entity 646, the management system 658 also comprises the corresponding security gateway 648. The management system 658 is linked to a short message service centre (an SMSC or messaging centre) 660 in the servicing network 654. The operator network also comprises a radio access network 662, in the case of FIG. 6 represented by a single base station.

It will be understood that the OAM entity 650 which is cooperating with the access point 616 has a primary communication path element which cooperates with the access point 616 in establishing and maintaining the primary communication path between the OAM entity 650 and the access point 616, a monitoring element which monitors the primary communication path and is capable of notifying the OAM entity when there is a communication problem on that path, an auxiliary communication path element which is capable of extending a connection from the OAM entity 650 to the access point 616, and a message sending element which is capable of sending a trigger message.

Furthermore, it will be understood that the access point 616 which is cooperating with the OAM entity 650 has a primary communication path element which cooperates with the OAM entity 650 in establishing and maintaining the primary communication path between the access point 616 and the OAM entity 650, and an auxiliary communication path element which is capable of establishing the auxiliary communication path with the OAM entity 650 to the access point 616.

The system of FIG. 6 is configured to provide a solution to the "node not reachable" problem described in the foregoing. From time to time, a user who controls the home network 610 may update software for various of the terminal devices and network elements in the home network 610, for example a printer, a router and the firewall. The user may be provided with "high security" option offered by an update tool to configure a firewall. This may result in no traffic other than HTTP and email being allowed to pass through the firewall. This can lead to the undesirable result that the access point 616 cannot be reached from outside, and in particular cannot be reached by the management system 658.

If the management system 658 determines it cannot reach the access point 616, it arranges for the SMSC 660 to send a short message service (SMS) message to the C-CL functionality 636 in the access point 616 over the air interface 664. This is a trigger message which, when received by the access point 616, causes it to send a response message to the OAM entity 650 to establish contact. The SMS message may contain connection parameters such as the IP address of the OAM entity 650 and/or the port number which is to be used, or it may simply be an empty message or a message identifying that it is a trigger message and nothing more. This SMS message corresponds to the message 434, and the response message corresponds to the "hello" message 436 of FIG. 4.

It should be noted that in receiving the trigger message, and possibly in communicating with the network 612, the node is operating as a mobile terminal device. Thus, the node may be working in two modes, that is both as a base station and as a terminal device. The node may switch operation between these two modes or may operate in both modes at the same time, that is in overlapping time periods.

The response message (which may be an empty message) is sent by the access point to the OAM entity 650. It may be sent on the port number and to the IP address contained in the SMS message, it may be sent to a preconfigured IP address and on a preconfigured port number, or the port number to be used may be determined by some other way. In any case, all that is required is for the response message to be sent on a port number at which the OAM entity 650 will be listening for such messages. When the access point 616 sends the response message, this punches a hole in the firewall 630, that is the sending of the response messages on a particular port number opens the firewall in respect of that port number for incoming messages and the firewall 630 will accept incoming packets on that port number. As a result, the management system 658 can now send commands via the primary communication path by using the port number which has been opened in the firewall.

It will be appreciated that although only one node is shown in FIG. 6, the management system 658 controls a number of nodes. It may control all of the nodes present in an operator network.

Embodiments have been described in which an auxiliary communication path is used only for the purposes of triggering a maintenance procedure. This may be preferred in certain embodiments in which the second communication path is considered to be insecure. In such cases, additional communications related to carrying out the maintenance procedure may be carried out over the primary communications path rather than over the auxiliary communication path. However, if the auxiliary communication path is considered to be secure, it, rather than the primary communication path, may be used to transfer configuration settings, software code or instructions, commands or instructions, or any other relevant message.

The OAM entity 650 may send OAM commands directly over the auxiliary communication path (that is through the cellular network) to avoid deadlock situations in which communication over the primary communication path cannot be established.

Generally, such a measure is preferred if the auxiliary communication path is secure.

Although in the foregoing, embodiments are described in which the auxiliary communication path is provided by a network different to the network providing the primary communication path, the same network can be used to provide both communication paths. For example, in an embodiment based on Femto access points, it is possible to use the communication options defined for OAM traffic to have a communication path which is provided by an IPSec tunnel via a security gateway and a communication path provided by a transport layer security (TLS) tunnel over Internet outside the IPSec tunnel. The IPSec tunnel and security gateway is always available for the user traffic. A system according to the invention can be configured so that the primary communication path is the IPSec tunnel via the security gateway and the auxiliary communication path is communication path which is a TLS tunnel or vice versa.

A particular embodiment of the logic applied in order to provide invocation of different escalation levels will now be described with reference to FIGS. 7, 8, and 9. These show various state-event handlers for different escalation scenarios presented in terms of flowcharts. Three state event handlers are implemented, a set-up OAM procedure running in the OAM system (FIG. 7), a message handler loop running in the OAM system (FIG. 8), and a consistency and availability check loop running in the access point node (FIG. 9). Therefore, it can be seen that two state-event handlers run on the network side (OAM) and one state-event handler runs in the node (the Femto access point).

Referring firstly to FIG. 7, the "set up OAM procedure" 710 running in the OAM system starts at point 712. The procedure starts with the OAM system having set the escalation level of the node to 0. The OAM system tries to establish communication with the node over the primary communication path 714. This corresponds to the step 430 of FIG. 4. It is determined whether this attempt was successful 716. If it was 718, this is the end 720 of the procedure (error escalation).

If it was not 722, the OAM system sets the escalation level of the node is to 1 and the OAM system tries to establish communication with the node over the auxiliary communication path 724, for example via a GPRS network. It is determined whether this attempt was successful 726. If it was 728, a procedure is triggered in the node which causes it to determine a checksum of the running software and another checksum of configuration data. These checksums are compared with the expected checksum result, either locally or remotely at the OAM system. The procedure may be stored in a secure area of the node. In effect, the node carries out a self-check, generates status information relating to data integrity and configuration settings, and has this checked either internally or at the OAM system 730. The status information is then evaluated to determine whether there has been potentially harmful manipulation of the node 732. If there has 734, the escalation level of the node is set to 2 and the OAM system sends a "reboot with factory settings" command to the node via the auxiliary path and a procedure is triggered in the node which causes it to return its current settings to factory settings and thus remove any potentially harmful configuration 736. This may be done by applying settings which are already present in the node or by downloading program code or factory settings via the auxiliary communication path. Once this has been done, the escalation level of the node is set to 0 and the OAM system attempts to establish the primary communication path with the node for OAM purposes 714.

If the OAM system determines that there has not been potentially harmful manipulation of the node 738, the OAM system checks the configuration settings received from the node, that is the settings which are used by the node to set up the primary communication path to the OAM system, to determine whether they are incorrect 740. If they are incorrect 742, a procedure is triggered in the node which causes it to load suitable configuration settings to overwrite the incorrect settings. These may be the last known working configuration settings. Configuration settings that are already present in the node may be used or they might be transferred to the node via the auxiliary path 744. The node applies the configuration settings. Once this has been done, the escalation level of the node is set to 0 and the OAM system attempts to establish the primary communication path with the node for OAM purposes 714. In other words, in order to deal with the problem of incorrect configuration settings preventing the (re-)establishment of communication via the primary communication path, configuration settings necessary to repair this path are provided and applied.

If the configuration settings of the primary path appear to be correct 746, that is there is no obvious reason for failure of link establishment, a remote trigger procedure is initiated via the auxiliary communication path to cause the node to attempt to establish communication with the OAM system via the primary communication path 748. This corresponds to the step 434 of FIG. 4. The remote trigger command is intended to cause the node to send he "hello" message to the OAM system. This corresponds to the step 436 of FIG. 4. When the OAM system receives the "hello" message from the node, it then knows that it can communicate with the node by using the port number on which the "hello" message arrived. If the communication problem has been caused by a firewall blocking communication to the node via a specific port, the sending of the "hello" message punches a hole through the firewall as has been discussed in the foregoing. Following receipt of the "hello" message, the OAM system is able to establish a connection to the node on an open port and the escalation level of the node is set to 0.

It is then determined whether communication between the node and the OAM system was re-established 750. If it was 752, then this is the end 720 of the procedure and the escalation level of the node is at 0. If it was not 754, this means that there is some fault present in the node which is not readily solvable and it needs to be repaired or replaced 720. Accordingly, the escalation level of the node is set to 3.

If it was not possible 756 for the OAM system to establish communication with the node over the auxiliary communication path in decision block 726, the node is out of control and needs to be repaired or replaced 720. Accordingly, the escalation level of the node is set to 3.

The term "Error escalation" applied to box 720 refers to measures to protect the MNO against possible fraud. Here are some examples of such measures: start supervision, that is if the node has a connection to the operator network but does not respond to management requests delete the node from a white-list or add the node to a black-list, and/or inform a customer care department of the MNO that subscriber interaction (such as a reset) is needed. This may involve a subscriber contacting the customer care and being asked to reset the node manually.

If the node needs to be repaired or replaced, the OAM system notifies the MNO which then contacts the user to arrange suitable remedial action to take place.

The procedure of FIG. 7 is carried out whenever the OAM system attempts to connect the access point and, in the event that there is a communication problem, the rest of the procedure takes place.

Referring now to FIG. 8, in order to cope with node originated messages on the auxiliary communication path, an endless loop, referred to as a "path 2 message handler" 810 is implemented on the network side in the OAM system. This handler 810 continuously polls the auxiliary communication path for messages 812. While it is doing this, the escalation level of the node is set at 0. If the OAM system receives a message from the node, which could be a "fraud alert" message or a configuration problem message, the escalation level of the node is set to 1. If the handler 810 determines 814 that a received message is a "fraud alert" message 816, the escalation level of the node is changed to 3, and the OAM system sends the "enforce reboot with factory settings" message to the node 818. A mentioned above, this triggers a procedure in the node which causes it to return its current settings to factory settings and thus remove any potentially harmful configuration 736. After reboot and reconfiguration of the node, a discovery procedure is carried out for the node with an initial part of the OAM system and a registration procedure is carried out for the node with a serving part of the OAM system. The discovery and registration procedures are used to repair fraudulent nodes and after successful registration further OAM connection set up steps take place.

If the OAM system does not receive a "fraud alert" message from the node 820, the OAM system checks 822 whether it has received a "configuration problem" message from the node. This corresponds to the decision block 740 of FIG. 7. If the OAM system has received such a message 824, valid configuration parameters are sent by the OAM system to the node via the auxiliary communication path 826 (that is corresponding to trigger 744 of FIG. 7) and, if necessary, further configurations are carried out to apply the configuration parameters.

Once there has been an enforced reboot, or correct configuration parameters have been received, the handler 810 returns to polling the auxiliary communication path for messages 812. At this point, the escalation level of the node has returned to 0.

Turning now to FIG. 9, on the node side (access point side) an endless loop, the "consistency and availability check loop" 910, runs. This loop continuously scans software and configuration data for data integrity and manipulation attempts 912. At the point, the escalation level of the node is set at 1.

A check 914 is carried out to determine if there has been manipulation. If it is determined that there has been manipulation 916, the escalation level of the node is set to 3, and the loop provides an indication to the node which causes it to switch off its air interface (or any main data communication interface used by the node in the case that it is not a wireless communication network element) 918. Once the air interface is switched off, a fraud alert is sent by the node to the OAM system via the auxiliary communication path 920. Once this has been done, the loop returns to step 912.

If it is determined that there has not been manipulation 924, a check 926 is carried out to determine if there is a configuration problem, for example if this data appears illogical which may be indicated by parameters being out of range. If there is 928, the loop provides an indication to the node which causes it to switch off its air interface (or any main data communication interface used by the node in the case that it is not a wireless communication network element) 930. Once the air interface is switched off, a configuration problem message is sent by the node to the OAM system via the auxiliary communication path 932. When the OAM system receives the configuration problem message, it sends appropriate configuration data and configures the node accordingly. Once this has been done, the loop returns to step 912. At this point, the escalation level of the node is set to 0.

If the check 926 does not detect a configuration problem 934, the loop 910 returns to scanning software and configuration data for data integrity and manipulation attempts 912.

In the foregoing, the term "trigger" applied to a procedure of FIG. 7, 8, or 9 refers to a procedure which is called, for example via the auxiliary communication path.

The invention allows a management system under the control of a network operator to connect to equipment of the network operator in an insecure home domain even when a primary connection to the equipment is not functioning. In an embodiment of the invention in which a cellular network is chosen to provide the auxiliary communication path, this provides a path which is secure. In addition, it is probable that it will be available, even when a primary communication path such as one provided over an access network such as DSL is down.

The invention provides a way of operation in which messages are only exchanged when necessary, for example when initiated by a management system. This avoids the need for a management system to receive frequent "keep alive" messages. For example, if a very large number of nodes in a communication system were to connect to an OAM system twice a day using "keep alive" messages, just handling these messages would be a considerable burden on the OAM system.

If regular "keep alive" messages are sent, this means that the OAM system only acts only at specified points in time, for example whenever the access point is issuing regular updates. However, in some cases the OAM system might need to trigger the node to engage in a maintenance procedure immediately, that is outside of a schedule, for example in the case that the node is operating in a way which is undesirable from the point of view of the network operator.

The invention facilitates integration of configurable nodes into home networks. A subscriber into whose home network the node is installed does not have to be advised to do manual changes to configure the home network (such as configuring the firewall) to make it compatible with the node.

As can be seen from the foregoing, the described embodiments are capable of applying a balanced escalation scheme which is capable of deactivating access points identified as operating fraudulently while not terminating the operation of those which are simply mis-configured. Therefore, it is not necessary to apply brute force disabling of access points deemed to be "fraudulent" or "malicious". This enables a management system to deal with a node which is supposed to be under its control and is not reachable, due to there being a mis-configured home network or element in such a network. This may represent a majority of access points flagged as having some kind of problem indicating incorrect operation In the foregoing, it is suggested that the auxiliary communication path can be used to carry out message exchange involved in solving a communication problem or carrying out a maintenance procedure. However, if the auxiliary communication path is expensive to use, whether this is in terms of a financial cost to transmit data, based, say, on time of use of a path or the amount of data transmitted, which may be the case if the auxiliary communication path is a secure path such as one making use of a cellular network, according to the invention it may be preferred to use a the auxiliary communication path sparingly with a basic command set, involving commands such as those to trigger communication establishment, reset the node to default configuration values, and initiate a software download.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of supervising a node in a communication system, the communication system comprising a supervising entity, a node under the supervision of the supervising entity, and a first communication path between the node and the supervising entity, the method comprising the steps of:
   determining that the node is unable to receive communications sent by the supervising entity via the first communication path; and
   triggering the node to send a message to the supervising entity to initiate a maintenance procedure,
   wherein the method proceeds according to an escalation level scheme in which a default escalation level is maintained when the node is able to receive communications sent by the supervising entity via the first communication path, a higher escalation level is set if irregular behavior is determined, and an even higher escalation level is set if there is a determination of fraud or deliberate tampering with the node.

2. A method according to claim 1 comprising establishing a second communication path between the node and the supervising entity.

3. A method according to claim 2 in which a trigger message is sent on the second communication path.

4. A method according to claim 2 in which the second communication path is established between a radio access network of a mobile network and the node.

5. A method according to claim 2 in which the second communication path is established as a secure connection.

6. A method according to claim 1 in which the first communication path is a default communication path used in the supervising entity exercising control over the node.

7. A method according to claim 1 in which the node is present in a home network.

8. A method according to claim 7 in which the supervising entity is present in a network different to the home network.

9. A method according to claim 1 in which the triggering is achieved by sending a short message service (SMS) message.

10. A method according to claim 1 in which the triggering causes the node to send a response message to the supervising entity.

11. A method according to claim 10 in which the response message is sent via the first communication path.

12. A method according to claim 10 in which sending of the response message opens a port which is then useable by the supervising entity in subsequent communication.

13. A method according to claim 1 in which supervising entity comprises a management system of an operator network.

14. A communication system comprising a supervising entity, a node under the supervision of the supervising entity, and a first communication path between the node and the supervising entity, the supervising entity comprising:
   a monitoring entity configured to determine whether the node is unable to receive communications sent by the supervising entity via the first communication path;
   a triggering element configured to trigger the node to send a message to the supervising entity to initiate a maintenance procedure; and
   a primary communication path element configured to establish communication between the supervising entity and the node via the first communication path,
   wherein the communication system is configured to proceed according to an escalation level scheme in which a default escalation level is maintained when the node is able to receive communications sent by the supervising entity via the first communication path, a higher escalation level is set if irregular behavior is determined, and an even higher escalation level is set if there is a determination of fraud or deliberate tampering with the node.

15. A supervising entity configured to supervise a node in a communication system over a first communication path between the node and the supervising entity, the supervising entity comprising:
   a monitoring element configured to determine whether the node is unable to receive communications sent by the supervising entity via the first communication path;
   a triggering element configured to trigger the node to send a message to the supervising entity to initiate a maintenance procedure; and
   a primary communication path element configured to establish communication between the supervising entity and the node via the first communication path,
   wherein the supervising entity is configured proceed according to an escalation level scheme in which a default escalation level is maintained when the node is able to receive communications sent by the supervising entity via the first communication path, a higher escalation level is set if irregular behavior is determined, and an even higher escalation level is set if there is a determination of fraud or deliberate tampering with the node.

16. A node configured to be supervised by a supervising entity in a communication system over a first communication path between the node and the supervising entity, the node comprising:
   a primary communication path element configured to receive communications from the supervising entity via the first communication path; and
   the node being capable, being triggered by the supervising entity, of sending a message to the supervising entity to initiate a maintenance procedure,
   wherein the node is configured to proceed according to an escalation level scheme in which a default escalation level is maintained when the node is able to receive communications sent by the supervising entity via the first communication path, a higher escalation level is set if irregular behavior is determined, and an even higher escalation level is set if there is a determination of fraud or deliberate tampering with the node.

* * * * *